UNITED STATES PATENT OFFICE.

ALBRECHT SCHMIDT AND OTTO SCHWAB, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF MAKING CONCENTRATED LIQUID DYESTUFFS.

No. 901,746.   Specification of Letters Patent.   Patented Oct. 20, 1908.

Application filed June 21, 1905. Serial No. 266,225.

*To all whom it may concern:*

Be it known that we, ALBRECHT SCHMIDT, Ph. D., and OTTO SCHWAB, Ph. D., both citizens of the Empire of Germany, and residing at Höchst-on-the-Main, Germany, have invented certain new and useful Improvements in Processes of Making Concentrated Liquid Dyestuffs, of which the following is a specification.

Applicants started with the idea of supplying the market with sulfurized dyestuffs in form of leuco-compounds of a liquid and yet concentrated state, similarly to the concentrated liquid indigo white-preparations for indigo vats etc. and with this object in view, applicants succeeded in finding a process by which products are obtained satisfactory both in respect to the mode of manufacture and dyeing. Said products contain the dyestuffs in a reduced liquid, yet concentrated stable form.

Applicants were guided by the following considerations and experiments:—The manufacture of sulfurized dyestuffs, for instance, that of sulfur-blacks, has hitherto been carried out by precipitating them from the aqueous sulfur-alkaline solution by acids or by the introduction of air until precipitation occurs, the sulfurized dyestuff linked to an alkali in the aqueous solution of the fusion in form of the leuco-compound and dissolved in sodium sulfid, then filtering and finally drying the press-cake thus obtained in the air or in a vacuum. This drying is an expensive, tedious and under certain circumstances a difficult operation as hereinafter set forth.

Applicants have further observed that in dyeing the moist press-cakes, especially in the manufacture of black, other changes occur in the dyestuffs than those hitherto known, so that the dyestuffs, whether dried by air or in a vacuum, become more difficultly soluble in sodium sulfid, that is to say, they require for dyeing comparatively more sodium sulfid than—with the same tinctorial power—moist dyestuff press-cakes would require. This is probably due to an alteration of the merkaptan groups, an alteration which is noticed also with products dried in the vacuum. It therefore would be economically very important, if the dyestuffs could be maintained in the condition of this ready solubility and in this reduced state, so that only small portions of sodium sulfid are required when dyeing. Yet, in order to render these products marketable, they ought to be of a concentrated and stable form. The moist dyestuff press-cakes are not suited for this purpose, as they become irregular by partially or completely drying up, lose their ready solubility and are no longer fit for the dyer as they get too solid and thick. The addition of water to render them pasty is of no advantage, as in order to obtain suitable pastes, too much water would have to be added (about two parts), which would render the dyestuff too thin for permitting its transmission.

Starting from our observation that dyestuffs of the above condition, that is to say, in an undried state, require much less sodium sulfid when dyeing than do dried dyestuffs and that such dyestuffs would consequently be more readily soluble in sodium sulfid, applicants have found that the following process leads to liquid, yet very concentrated and stable products, by a process which differs from that of dissolving in sodium sulfid and evaporating to dryness described in German patent No. 127,835. These liquid products are obtained by stirring the moist dyestuff press-cakes with sodium sulfid in certain proportions. These proportions may be deduced from the following new observations: When the above-mentioned sulfurized dyestuff press-cakes are stirred, for instance, with increasing quantities of fused crystalized sodium sulfid, the following is observed: The mass gradually arrives at a point at which the paste has just become liquid, that is to say, it passes from a doughy condition into a fluid form, no more insoluble pasty pieces are present and the whole will pass through a viscosimeter. The proportion of sodium sulfid necessary to bring about this liquidity is the lower limit for the manufacture of a concentrated liquid sulfurized dyestuff. The viscosimeter indicates already comparatively good numbers, for instance, 200 as compared with 82 for water, but not as low as when a further limited proportion of sodium sulfid is added; moreover, on standing, the solutions still become gelatinous and much thicker. Nevertheless, preparations with this proportion of sodium sulfid are already suitable for transmission over short distances. When now a further proportion of sodium sulfid is added, the solution becomes at first still more liquid, the viscosimeter number falls considerably, but on continued addition of the sulfid the viscosity increases again and finally a point is attained when the mass solidifies after a short time. It would seem, therefore, that while at first an easily soluble salt of the sulfurized dyestuff is formed, the addition of more sodium sulfid either produces a sparingly soluble basic salt, or has the effect of salting out. The best degree of viscosity is thus between two limits, namely, a lower limit at which just a solution of the dyestuff occurs, and an upper limit, at which no solidification occurs on long standing. These limits within which this phenomenon happens, that is to say, the limits for the best degree of liquidity, vary according to the particular dyestuff used, and also, of course, according to the desired concentration. For these reasons no specific limits for the proportion of sodium sulfid as compared with the weight of the dyestuff are given; the limits of proportion to be observed are distinctly determined in each case from the foregoing observations, namely, that the undried dyestuff obtained by precipitation is to be treated only with such proportions of sodium sulfid as to transform the dyestuff into a complete solution which keeps liquid on standing. This is best ascertained by the use of the viscosimeter, so that preferably liquid solutions may be obtained.

When, for instance, it were essential to state limits, they might be stated as follows:— from 30 to about 150 parts of sodium sulfid (calculated as crystallized salt) to 100 parts of concentrated dyestuff (calculated as dry). In the form of these solutions the dyestuffs maintain their shades unaltered when the proportions of sodium sulfid are within the aforesaid limits, even after long standing. All the sodium sulfid which is added enters into the reaction and combines with the dyestuff so that the latter becomes soluble in the form of the new compound, remains dissolved, and that the product contains no excess of uncombined sulfid."

In carrying out the process it is of advantage to use the press-cakes in a condition as free from salt as possible, since then the danger of salting out is diminished and dyestuff solutions of very high percentage strength with proportionally low specific gravity, are obtained.

The liquid and yet concentrated products made according to this process have great advantages as compared with dried isolated dyestuffs. In the first place their application in the dye-house is much easier, for it is easier to measure than to weigh. Again, the use of liquid products will abolish the troublesome and unhealthy dust of the dried dyestuffs, which has hitherto been unavoidable in handling the latter in the dye-house.

Moreover, it has been proved that with the liquid products the total consumption of sodium sulfid in dyeing is essentially less, a fact which has already been explained. The vat-solutions have the further advantage of less saponifying the fat of the fiber which is due to the vat containing less alkali and the waste water less sodium sulfid. The dyeing with these highly concentrated products is consequently cheaper, less troublesome and more reliable than dyeing with dried isolated products. Moreover, the cost of manufacturing these liquid highly concentrated products is less than that of the dried products.

The various advantages in the production are, for instance, the following: The troublesome and expensive drying on trays or the like is avoided, an operation all the more disagreeable as the drying in the air greatly reduces the tinctorial power and drying in a vacuum is still more expensive, besides involving more time. Products dried on trays form pieces and require pulverization to render them fit for dyeing, which takes up time, is expensive and unhealthy on account of the dust. All these operations are avoided in the manufacture of concentrated liquid products. The press-cakes obtained are simply stirred with the proportion of sodium sulfid requisite for the manufacture of highly concentrated liquid solutions. These solutions obtained by means of the exact proportion of sodium sulfid need not be condensed and dried as in the case of German patent No. 127,835, which process has also the disadvantage of producing dust by which the respirative organs are greatly irritated as a consequence of the contents of dry sodium sulfid; besides the further disadvantage of the dyestuff powder thus obtained is the ready loss of its contents of sodium sulfid when exposed to the air, which is not the case with the concentrated solutions obtained by this process. On the contrary, on their being exposed to the air they are covered by a thin layer, just as with the indigo vat by which the contact with the air is cut off and the insoluble indigo separates and no longer dyes. Alkali hydrates have no special effect upon the product; alkaline salts, added in a solid state, thicken the product; steam does not change anything in the constitution of the product except that the same is thereby unnecessarily diluted.

Example I. 1347 parts of a press-cake containing about 60% of dry matter, as obtained by melting trinitroamidodiphenylamin (from 1:2:4-dinitrochlorobenzene and nitro-p-phenylenediamin) with polysulfid, isolating the dyestuff by blowing air into the aqueous solution of the fused mass, filtering and subjecting the mass to hydraulic pressure, are stirred with successive portions of fused crystallized sodium sulfid, warm or cold. When 600 parts of sodium sulfid have been added, the mass is still thick and contains undissolved particles; when 800 parts of sodium sulfid have been added, solution has occurred and the viscosimeter number is for instance 150 as compared with 82 for water; this proportion therefore represents the one limit of the most favorable condition. When the addition of the sodium sulfid is continued, it is found that when a total of 950 parts of sodium sulfid has been added the viscosity is 120 and on further addition of, for instance, 2, 5, 10 or 15% of sodium sulfid, calculated on the weight of the dyestuff solution, the viscosity increases, until finally, on standing, the dyestuff solution to which the maximum proportion of sodium sulfid has been added solidifies. This maximum proportion is the upper limit, as may be seen from the following table:

| cryst. sodium sulfid parts | 950 | addit. of cryst. sodium sulfid in percentage of the dyestuff solution: | 2.5 | 5 | 15 | 10 | 20% |
|---|---|---|---|---|---|---|---|
| viscosity | 120, | viscosity | 118 | 129 | 154 | 173 | solidifies |

Example II. 6850 parts of a press-cake containing about 46% of dry matter, obtained by blowing air through the aqueous solution of the product from 1:2:4-dinitrophenol, made according to the French patent No. 259,509 until precipitation is complete, and filtering and pressing, are stirred with successive portions of fused crystallized sodium sulfid. When about 2500 parts have been added, dissolution occurs and the viscosity is 155, water being 82; this number increases gradually on addition of 2, 5, or 10% of sodium sulfid to the solution, until finally, at about 15% solidification ensues on standing. The proportions of sodium sulfid and the corresponding viscosities for 1000 grams of concentrated dyestuff, calculated at a concentration of the dyestuff solution of 34% in respect of the dry dyestuff as free as possible from salt, were, for instance, as follows:

| cryst. sodium sulfid grams | 750 | addit. of crystall. sodium sulfid grams | 70 | 140 | 380 | 400 |
|---|---|---|---|---|---|---|
| viscosity ($H_2O-82$) | 154 | viscosity | 158 | 170 | 193 | becomes solidified |

A product obtained from a fusion with less sulfur gave the following results for 1000 grams of dyestuff calculated at a concentration of 35% of the dyestuff:

| cryst. sodium sulfid grams | 888 | addit. of cryst. sodium sulfid grams | 72 | 144 | 288 | 432 | 576 |
|---|---|---|---|---|---|---|---|
| viscosity | 114 | viscosity | 117 | 122 | 177 | 185 | 231 solid. |

Example III. 3375 parts of a press-cake containing about 44 per cent. of dry matter, as obtained by precipitating by means of air or acids the dyestuff solution made according to the process of German patent No. 127,835 and pressing the precipitate, required 400 parts of calcined sodium sulfid containing about 60% of $Na_2S$, or 800 parts of crystallized sodium sulfid to produce 3775 parts of a concentrated dyestuff solution, which not only contains the dyestuff permanently dissolved, and therefore not gelatinized, but also already exhibits a satisfactory degree of liquidity (for example, a viscosity of 162). The effect of further proportions of sodium sulfid for 1000% of concentrated dyestuff calculated at a concentration of the dyestuff solution of 39% in respect of the dry dyestuff used, was as follows:

| cryst. sodium sulfid grams | 800 | addit. of cryst. sodium sulfid grams | 60 | 120 | 240 | 360 | 480 |
|---|---|---|---|---|---|---|---|
| viscosity | 162 | viscosity | | 152 | 160 | 244 | |

Example IV. 500 parts of a concentrated press-cake of about 37% strength, obtained from a fusion of dinitro-oxy-diphenylamin according to German patent No. 103,861, by precipitation with acids or even with air, required about 300 parts of crystallized sodium sulfid to make it a thin liquid, which remains in that condition.

Example V. 500 parts of a press-cake of 36.5% strength, obtained by melting polysulfid or boiling with an aqueous solution of polysulfid the indophenol $O=C_6H_4=N-C_6H_4(NH_2)_2CH_3$ (1) are mixed with a gradually increasing quantity, amounting to 100, 200 and finally 300 parts, of fused crystallized sodium sulfid, whereby the thick paste passes, at 300 parts, into complete solution; as this by long standing becomes a thick liquid, yet another 100 parts of sodium sulfid are added, whereupon a thin liquid is obtained, while by addition of further proportions of sodium sulfid such as another 200-300 parts, a mass is produced which becomes solid on standing.

Example VI. 300 parts of a press-cake of thiogene brown S, obtained by dissolving commercial thiogene-brown S in water, precipitating with acid and pressing, are stirred with a gradually increasing proportion of fused sodium sulfid, amounting finally to about 180 parts. The concentrated solution is a thin fluid and remains so on standing.

Having thus described our invention, we claim as new and desire to secure by Letters Patent:

The process herein described of making highly concentrated liquid sulfurized dyestuffs, which consists in adding to the undried dyestuff, obtained directly in its manufacture, sodium sulfid in such proportions that the dyestuff is transformed into a complete solution which preserves its liquid condition on standing.

In testimony, that we claim the foregoing as our invention, we have signed our names in presence of two subscribing witnesses.

ALBRECHT SCHMIDT.
OTTO SCHWAB.

Witnesses:
ALFRED BRISBOIS,
BERNHARD LYDECKER.